March 15, 1927. Re. 16,573
R. TANNER
PROPELLING MEANS
Original Filed July 17. 1924
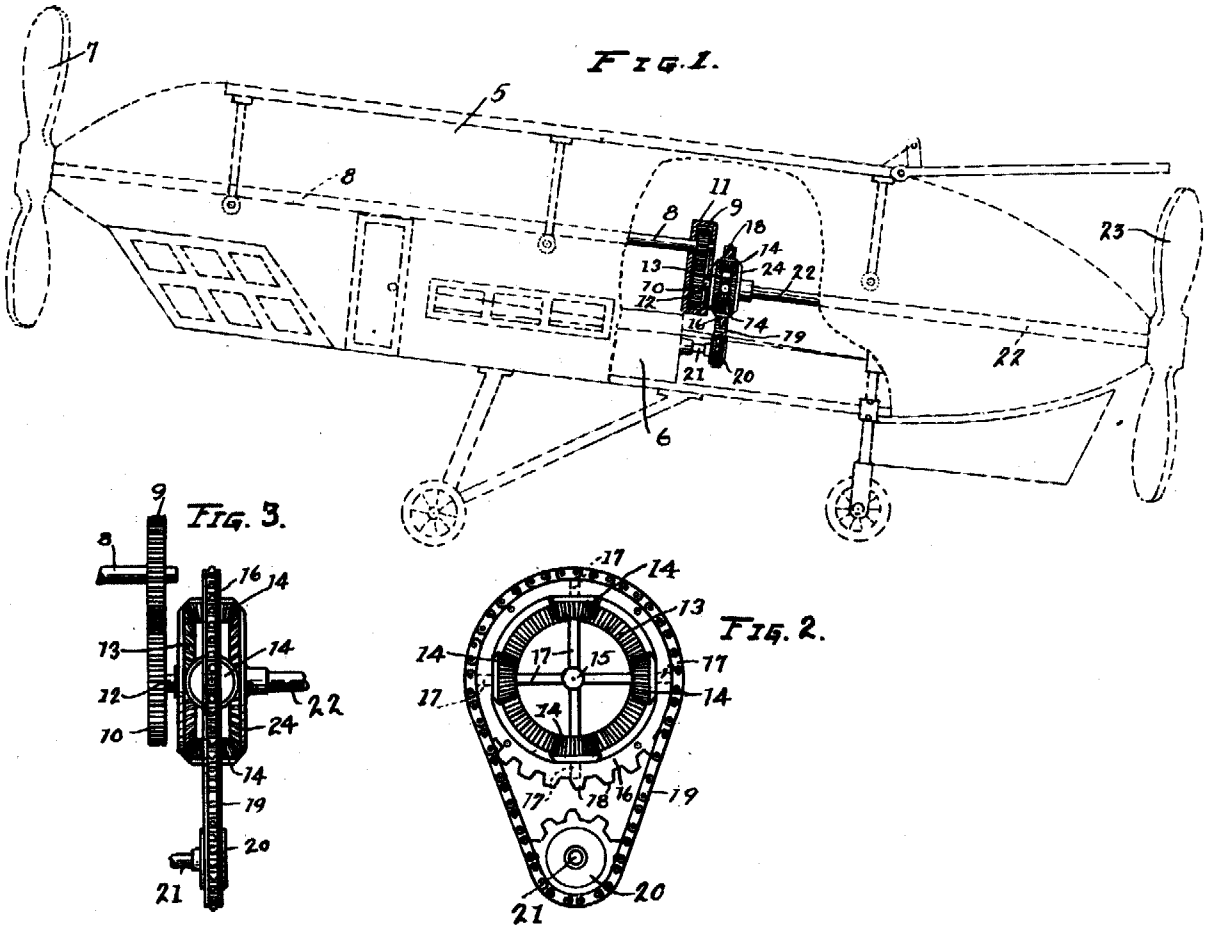
INVENTOR
ROE TANNER.
By Richey & Watts
HIS ATTORNEYS.

Reissued Mar. 15, 1927. Re. 16,573

UNITED STATES PATENT OFFICE.

ROE TANNER, OF ATTICA, OHIO.

PROPELLING MEANS.

Original No. 1,523,671, dated January 20, 1925, Serial No. 726,557, filed July 17, 1924. Application for reissue filed December 31, 1926. Serial No. 158,349.

This invention relates to propelling means for aircraft and aims to provide a novel means whereby a propeller at the forward end of a machine and a propeller at the rear end of the machine may be simultaneously operated to move the craft in a given direction, the pitches of the blades of the propellers being such as to produce an equal amount of torque to the body portion of the machine, thereby stabilizing the machine.

Another important object of my invention is to direct the power to the propellers in such a way that the propellers will adjust themselves to give an equal thrust when in operation.

A further object of my invention is to construct propelling mechanism for aircraft and the like, whereby a propeller at the forward end of the aircraft body and a propeller at the rear end of the body may be simultaneously operated to move the craft in a given direction.

A further object of my invention is to provide air craft propelling means wherein propeller shafts extend forwardly and rearwardly of the supporting frame in substantially parallel planes, said shafts being connected to be driven in opposite directions from the power being transmitted to the propellers in such a way that the propellers will automatically adjust themselves to give an equal thrust when in operation.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

Referring to the drawing:

Fig. 1 illustrates a side elevational view of an aircraft supplied with propelling means constructed in accordance with the present invention.

Fig. 2 is an end view of a portion of gearing employed for transmitting power from the power shaft to one of the propeller shafts.

Fig. 3 is a side elevational view of the power transmitting mechanism, showing the propeller shafts in position.

Referring to the drawing in detail, the reference character 5 designates the supporting frame or fuselage of an aircraft and 6 designates the power plant of the machine.

The forward propeller 7 is mounted on the forward extremity of the propeller shaft 8 which extends longitudinally and substantially centrally of the fuselage 5. The shaft 8 carries a pinion 9 on its inner end, meshing with the pinion 10, which pinions are rotatably mounted in the gear housing 11. The pinion shaft 12 which carries the pinion 10, also carries a beveled gear 13 which meshes with the beveled pinions 14 rotatably mounted upon the several spokes 17 of the spider 15, there being provided a supporting ring gear 16 into which the spokes 17 of the spider extend.

The ring 16 is provided with teeth on its outer periphery over which the chain 19 operates, the chain also operating over a pinion 20 carried at one end of the crank shaft 21 of the power plant 6, so that rotation of the crank shaft will result in a relative movement of the spider to rotate the pinions associated therewith. The rear propeller shaft is indicated at 22 and extends rearwardly in a plane substantially parallel to that of the forward propeller shaft and substantially centrally within the fuselage 5. A propeller 23 is mounted on the outer end of the propeller shaft 22, the pitch of the blades of the propeller 23 being the reverse of the pitch of the blades of the propeller 7, so that as the propellers are rotating in opposite directions, both propellers will act to move the machine in a common direction.

It will be noted from the present illustrated embodiment of my invention that the forward propeller shaft 8 and the rearward propeller shaft 22 extend longitudinally of and within the fuselage 5, the said shafts being arranged so that their longitudinal axes are slightly offset or out of alignment with respect to each other, yet are disposed in substantially parallel planes. Mounted on the inner end of the propeller shaft 22 is a beveled pinion 24 which meshes with the beveled pinions 14, whereby power may also be transmitted to the shaft 22.

From the foregoing, it will be obvious that due to the oppositely pitched propellers 7 and 23 and to the directions of rotation of the respective propeller shafts, the combined thrust of the propellers will move the air craft forwardly when the power plant is put into motion.

From the foregoing, it also will be obvious that the propeller at the rear of the machine and which operates under less resistance than the forward propeller, would normally tend to operate at a greater speed, but due to the manner of transmitting the power to the shafts 8 and 22, the speeds of the respective propellers will be automatically adjusted to give equal thrusts, regardless of the rate at which the power plant is running.

While I have shown and described propelling mechanism for use in connection with aircraft, it is to be understood that the invention may be efficiently employed for use in connection with other motor vehicles including water craft without departing from the spirit of my invention or the scope of the subjoined claims.

What is claimed is:—

1. In an airship, the combination with a supporting frame and a motor, of a forward propeller shaft, and a rearward unaligned propeller shaft, motor driven differential gearing connecting said shafts, said shafts extending longitudinally and substantially centrally of the supporting frame, and propellers on the free ends of said shafts.

2. In an airship, the combination with a supporting frame and a motor, of a forward propeller shaft, a rearward unaligned propeller shaft motor driven differential gearing connecting said shafts, and propellers on the free ends of said shafts.

3. In an airship, the combination with a supporting frame and a motor, of a forward propeller shaft, a rearward unaligned propeller shaft, motor driven differential gearing connecting said shafts, and propellers on the free ends of said shafts, the blades of said propellers being pitched in opposite directions.

4. In an airship, the combination with a supporting frame and a motor, of a forward propeller shaft, and a rearward propeller shaft, motor driven differential gearing connecting said shafts, said shafts extending longitudinally and substantially centrally of the supporting frame, and propellers on the free ends of said shafts, the blades of said propellers being pitched in opposite directions.

5. In an airship, the combination with a supporting frame and a motor, of a forward propeller shaft, and a rearward unaligned propeller shaft, motor driven differential gearing connecting said shafts, said shafts extending longitudinally and substantially centrally of the supporting frame, and propellers on the free ends of said shafts, the blades of said propellers being pitched in opposite directions.

6. In an aeroplane, a supporting frame, propeller shafts extending longitudinally within the supporting frame, the longitudinal axes of said shafts being arranged in offset end to end relation, a motor carried by the supporting frame and gearing connecting the adjacent ends of said propeller shafts with said motor, whereby the rates of rotation of said shafts may be automatically adjusted to give an equal thrust to said supporting frame.

7. In an aeroplane, a supporting frame, propeller shafts extending longitudinally within the supporting frame, the longitudinal axes of said shafts being arranged in offset end to end relation, a motor carried by the supporting frame, and gearing between adjacent ends of said propeller shafts and said motor, whereby the rates of rotation of said shafts may be automatically adjusted to give an equal thrust to said supporting frame, and whereby said shafts may be rotated in opposite directions.

8. In an aeroplane, a supporting frame, propeller shafts extending longitudinally within the supporting frame, the longitudinal axes of said shafts being arranged in offset end to end relation, a motor carried by the supporting frame, and gearing between adjacent ends of said propeller shafts and said motor, whereby the rates of rotation of said shafts may be automatically adjusted to give an equal thrust to said supporting frame, and whereby said shafts may be rotated in opposite directions, said gearing including a driven pinion carrying ring in power transmitting relation with the end of one of said propeller shafts.

9. A propelling mechanism for air-craft including a motor, a motor shaft, unaligned propeller shafts extending in substantially parallel planes and in opposite directions, propellers carried on said shafts, a gear carried on one end of one of said shafts, a beveled pinion carried on one end of the other of said shafts, and means intermediate the motor and the geared ends of the propeller shafts for transmitting power to said shafts, said means including a driven ring, pinions carried and rotatable with said ring, said pinions meshing with the beveled gear carried by one of the propeller shafts, a pinion meshing with the gear on the end of said other propeller shaft, a shaft carrying said first named pinion, a beveled gear meshing with the pinions carried by the ring and carried by said last named shaft for connecting the said ring in power transmitting relation with the other propeller shaft, and a chain for transmitting power from said power plant to drive said ring.

10. In an airship, the combination with a supporting frame and a power plant, of a forward propeller shaft, a rearward propeller shaft, propellers on the free ends of said shafts, said shafts being arranged in offset end to end relation, and means responsive to the speed and thrust of the respective propellers for driving the propellers.

11. In an airship, the combination with a supporting frame and a motor, of a forward propeller shaft, a rearward unaligned propeller shaft, propellers on the free ends of said shafts, and motor driven differential gearing connecting said shafts and rotating said shafts in opposite directions.

12. In an airship, the combination with a supporting frame and a motor, of a forward propeller shaft, a rearward unaligned propeller shaft, propellers on the free ends of said shafts, and motor driven differential gearing connecting said shafts and rotating said shafts in opposite directions, the respective blades of said propellers being oppositely fixed.

In testimony whereof, I hereunto affix my signature this 19 day of January, 1927.

ROE TANNER.

CERTIFICATE OF CORRECTION.

Reissue Patent No. 16,573. Granted March 15, 1927 to

ROE TANNER.

It is hereby certified that error appears in the printed specification of the above numbered patent requiring correction as follows: Page 3, line 16, claim 12, for the word "fixed" read "pitched"; and that the said Letters Patent should be read with this correction therein that the same may conform to the record of the case in the Patent Office.

Signed and sealed this 26th day of April, A. D. 1927.

M. J. Moore,
Acting Commissioner of Patents.

Seal.